(No Model.)

M. RYNEAR.
ARTIFICIAL TOOTH CROWN.

No. 342,761.            Patented May 25, 1886.

ATTEST:
E. C. Rowland.
J. W. Kiddle.

INVENTOR:
Moses Rynear,
By Dyer & Seely
Attys.

United States Patent Office.

MOSES RYNEAR, OF NEW YORK, N. Y.

ARTIFICIAL TOOTH-CROWN.

SPECIFICATION forming part of Letters Patent No. 342,761, dated May 25, 1886.

Application filed October 5, 1885. Serial No. 179,010. (No model.)

*To all whom it may concern:*

Be it known that I, MOSES RYNEAR, of New York city, in the county and State of New York, have invented a certain new and useful Improvement in Artificial Tooth-Crowns and in Means for and Processes of Setting the Same, of which the following is a specification.

The object I have in view is to enable an artificial tooth-crown to be set upon and secured to a natural root by a means and process which will enable the work to be done with certainty as to its permanency and perfection, and which will not necessitate the removal of the cementum encircling the root at its top or cause the irritation of the mucous membrane.

Figure 1:
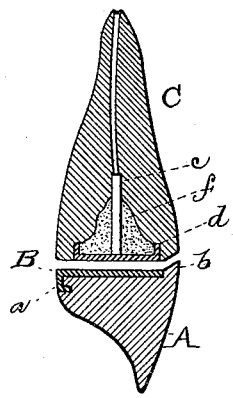
Figure 2:
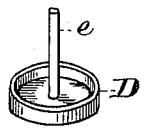
Figure 3:
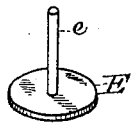
Figure 4:

In the accompanying drawings, forming a part hereof, Figure 1 is a sectional view of root and crown ready to be secured together; Fig. 2, a separate perspective view of the pan and pin inserted in root; Fig. 3, a perspective view showing a disk and pin which may be used instead of the pan and pin; and Fig. 4, a perspective view of the base-plate of crown reversed.

I prefer to use an entire crown, A, of porcelain or other composition, to the base of which is baked a platinum plate, B, as described in an application already filed by me, Serial No. 170,682. This platinum plate B, however, instead of being held by pins, as described in said application, has an inwardly-turned rim, a, which holds the plate on. This rim does not extend for a short distance on front of plate where the porcelain tooth is extended beyond the plate, as at b. This inwardly-turned rim has advantages over pins for holding the plate to the artificial crown, since it permits a thin platinum plate to be used at the same time that a considerable peripheral surface is exposed, and since this peripheral surface is held at every point it may be cut into without detaching the plate.

The natural root C, after being cut off square, is provided by suitable tools of a definite size with a central bearing, c, in the nerve-canal, and a countersink, d, surrounding the nerve-canal, the countersink and central bearing being concentric. A metallic pan, D, having a central pin, e, is placed in the countersink, while the pin extends into the central bearing, c. A disk, E, may be used instead of the pan. The pan or disk is made of a definite size to fit countersink d accurately, and it forms a broad lateral bearing, which, with the central bearing formed by pin e, will effectually prevent any rocking movement of the crown. After the pan and pin are fitted to the root, and the crown is also fitted thereto properly, the plate B of the artificial crown is soldered to pan D or disk E, and the pan or disk and central pin are again inserted into the countersink and central bearing of root, sufficient cement, f, being used at the same time to hold the parts in place. The pin e may be secured to plate B and pass through hole in pan D or disk E.

The pan D and disk E may be generically described as plates for giving the broad bearing before referred to, the disk being a simple plate and the pan a plate with flanged edge.

By the use of the plate in the countersink with pin in central bearing, a strong construction is provided which does not require the destruction of the cementum surrounding the root, nor does it irritate the mucous membrane.

I am aware that it is old to attach artificial crowns to natural tooth-roots by fitting caps over the prepared roots, with central pins extending into the roots, the crowns being secured to such caps; but this process is subject to the objections that the cementum is destroyed and the mucous membrane irritated.

What I claim is—

1. The combination of plate in countersink formed in root, and the artificial crown secured to such plate, substantially as set forth.

2. The combination of plate in countersink formed in root, the central pin, and the artificial crown secured to such plate, substantially as set forth.

3. The combination of plate in countersink formed in root, the central pin, and the artificial crown formed complete of composition and having a plate baked to its base, such plate being secured to the plate of root, substantially as set forth.

4. The artificial crown A, having plate B, with inwardly-turned rim a baked upon its base, substantially as set forth.

This specification signed and witnessed this 1st day of October, 1885.

MOSES RYNEAR.

Witnesses:
A. W. KIDDLE,
E. C. ROWLAND.